United States Patent
Dery

(10) Patent No.: US 7,483,783 B2
(45) Date of Patent: Jan. 27, 2009

(54) REMOTE STARTING SYSTEM FOR A VEHICLE

(75) Inventor: Normand Dery, Sherbrooke (CA)

(73) Assignee: Astroflex Inc., Ste-Elie d'Orford, Quebec (CA)

( * ) Notice: Subject to any disclaimer, the term of this patent is extended or adjusted under 35 U.S.C. 154(b) by 177 days.

(21) Appl. No.: 11/698,582

(22) Filed: Jan. 26, 2007

(65) Prior Publication Data

US 2007/0198167 A1 Aug. 23, 2007

Related U.S. Application Data

(63) Continuation of application No. 10/747,295, filed on Dec. 29, 2003, now Pat. No. 7,191,053, which is a continuation-in-part of application No. 10/034,384, filed on Dec. 27, 2001, now abandoned.

(30) Foreign Application Priority Data

Dec. 21, 2001 (CA) .................................. 2365887

(51) Int. Cl.
*G06F 19/00* (2006.01)
*F02P 9/00* (2006.01)
*G06G 7/00* (2006.01)

(52) U.S. Cl. .................................. 701/113; 123/179.2

(58) Field of Classification Search ................. 701/113, 701/115, 102, 29, 35; 123/179.2, 179.4; 324/207.2

See application file for complete search history.

(56) References Cited

U.S. PATENT DOCUMENTS

| | | | |
|---|---|---|---|
| 3,577,164 A | 5/1971 | Re Baratelli et al. |
| 4,404,639 A | 9/1983 | McGuire et al. |
| 4,924,391 A | 5/1990 | Hirano et al. |
| 4,967,143 A | 10/1990 | Raviglione et al. |
| 4,989,146 A | 1/1991 | Imajo |
| 5,007,050 A | 4/1991 | Kasparian et al. |
| 5,024,186 A | 6/1991 | Long et al. |
| 5,034,889 A | 7/1991 | Abe |
| 5,056,023 A | 10/1991 | Abe |
| 5,278,547 A | 1/1994 | Suman et al. |
| 5,278,759 A | 1/1994 | Berra et al. |
| 5,435,408 A | 7/1995 | Sekinobu |
| 5,442,553 A | 8/1995 | Parrillo |

(Continued)

FOREIGN PATENT DOCUMENTS

CA 2365887 6/2003

(Continued)

*Primary Examiner*—Hieu T Vo
(74) *Attorney, Agent, or Firm*—Ladas & Parry LLP

(57) ABSTRACT

A slave controller for a remote vehicle starting system. The slave controller is mounted in a vehicle having an internal combustion engine started by a starter motor. The slave controller has an antenna circuit input for connection to an antenna circuit suitable for picking up an RF signal and an output. The slave controller also has a control module, coupled to the antenna circuit input. The control module is responsive to a signal transmitted through the antenna circuit input and originating from the antenna circuit to generate a command signal at the output for directing the starter motor to crank the internal combustion engine. The control module is operative to establish a data communication with an external entity through the antenna circuit input to perform a maintenance procedure.

71 Claims, 1 Drawing Sheet

U.S. PATENT DOCUMENTS

| | | |
|---|---|---|
| 5,479,157 A | 12/1995 | Suman et al. |
| 5,541,840 A | 7/1996 | Gurne et al. |
| 5,601,058 A | 2/1997 | Dyches et al. |
| 5,614,883 A * | 3/1997 | Dery et al. ............ 340/458 |
| 5,617,819 A | 4/1997 | Dery et al. |
| 5,650,774 A | 7/1997 | Drori |
| 5,737,711 A | 4/1998 | Abe |
| 5,942,988 A | 8/1999 | Snyder et al. |
| 5,964,813 A | 10/1999 | Ishii et al. |
| 6,070,111 A | 5/2000 | Takakura et al. |
| 6,140,938 A | 10/2000 | Flick |
| 6,351,703 B1 | 2/2002 | Avery, Jr. |
| 6,452,483 B2 | 9/2002 | Chen et al. |
| 6,467,448 B2 | 10/2002 | Wisnia et al. |
| 6,700,479 B2 | 3/2004 | Birchfield |
| 7,191,053 B2 * | 3/2007 | Dery ............ 701/113 |
| 2003/0120419 A1 | 6/2003 | Dery |

FOREIGN PATENT DOCUMENTS

JP  2005-335275 A  * 12/2005

* cited by examiner

REMOTE STARTING SYSTEM FOR A VEHICLE

CROSS REFERENCE TO RELATED APPLICATIONS

This application is a continuation of U.S. patent application Ser. No. 10/747,295 filed Dec. 29, 2003, now U.S. Pat. No. 7,191,053 B2, issued on 13 Mar. 2007, which is a continuation-in-part of U.S. patent application Ser. No. 10/034,384 filed Dec. 27, 2001, now abandoned. The contents of the above noted document are hereby incorporated by reference.

FIELD OF THE INVENTION

The invention relates to a remote starting system for a vehicle that is responsive to an RF signal to start the engine of the vehicle.

BACKGROUND OF THE INVENTION

A typical remote starting system for a vehicle has a slave controller mounted in the vehicle and a hand held command module. When the user desires to remotely start the engine of the vehicle, he or she depresses a button on the command module that generates an RF signal. The slave controller pick-ups the RF signal and performs an engine starting sequence. The starting sequence includes energizing the starter motor to crank the engine and, once the engine has started, turning off the starter motor.

Currently available remote starting systems for a vehicle are usually designed to be installed in a wide range of vehicles. It follows that during the installation of the remote vehicle starting system in a particular vehicle, the slave controller must be properly configured to match the vehicle parameters, such as the type of engine (gasoline or diesel), the number of cylinders, the starter cut-off RPM limit and the idle speed, among others. This configuration is usually effected by setting the position of Dual In-line Package (DIP) switches on the housing of the slave controller. This approach is time consuming, which is undesirable.

Another drawback of currently available remote vehicle starting systems is the difficulty to perform repairs. The technician attempting to diagnose a malfunction has little information about the problem, in particular when it is an intermittent one. This renders the diagnostic operation time consuming, complex and may result in the replacement of good parts.

Accordingly, there is a need in the industry to provide remote vehicle starting systems that are easier to configure for installation in particular vehicles and also facilitate diagnosis of malfunctions.

SUMMARY OF THE INVENTION

In one broad aspect, the invention provides a slave controller for mounting in a vehicle having an internal combustion engine started by a starter motor. The slave controller has an antenna circuit input for connection to an antenna circuit suitable for picking up a radio frequency signal and an output. The slave controller also has a control module, coupled to the antenna circuit input. The control module is responsive to a signal transmitted through the antenna circuit input and originating from the antenna circuit to generate a command signal at the output for directing the starter motor to crank the internal combustion engine. The control module is also operative to establish a data communication with an external entity through the antenna circuit input to perform a maintenance procedure.

The advantage of this slave controller is to allow a technician to perform maintenance on the slave controller without the necessity to search in the vehicle a special service port to which the external module is to connect. Since the antenna circuit input connects with the antenna circuit through a cable that is easily accessible, it suffices to connect the external entity to that cable such as to establish the electrical pathway with the antenna circuit input.

In a second broad aspect, the invention provides a slave controller for mounting in a vehicle having a plurality of electrical sub-systems, one of the electrical sub-systems being a starter sub-system operative to crank an internal combustion engine. The slave controller has a set of ports, each port being suitable for electrical connection to a respective electrical sub-system of the plurality of electrical sub-systems, the set of ports including a starter port suitable for electrical connection to the starter sub-system. The slave controller includes a control module, coupled to the set of ports, the control module being responsive to an RF signal to generate a command signal at the starter port for causing energization of the starter sub-system. The control module is also operative to establish a data communication with an external entity through at least one port of the set of ports via the respective electrical sub-system thereof, to perform a maintenance procedure.

In a third broad aspect the invention provides a slave controller for mounting in a vehicle having an internal combustion engine started by a starter motor. The slave controller comprises an output and a control module coupled to the output. The control module is operative to establish a data communication with an external entity to receive and store configuration data and is responsive to an RF signal to generate a command signal at the output for directing the starter motor to crank the internal combustion engine. The generation of the command signal is effected by processing the configuration data.

In a fourth broad aspect the invention provides a slave controller for mounting in a vehicle having an internal combustion engine started by a starter motor. The slave controller comprises an antenna circuit input for connection to an antenna circuit suitable for picking up an RF signal, an output and a control module coupled to the antenna circuit and the output. The control module includes a CPU, a storage medium for storing program data for execution by said CPU and for storing an event log. The control module is responsive to an RF signal transmitted through the antenna circuit input and originating from the antenna circuit to generate a command signal at the output for directing the starter motor to crank the internal combustion engine. The generation of the command signal is effected at least in part on a basis of processing of data by the CPU by execution of said program data. The program data, while executed by the CPU, monitors the control module for occurrence of predetermined events, and, if at least one of the predetermined events occurs, creates an entry in the event log associated with the occurred predetermined event. The program data, while executed by the CPU, is operative to record at least one marker in the event log allowing to differentiate between an order of occurrence of events recorded in the event log.

In a fifth broad aspect the invention provides a slave controller for mounting in a vehicle having an internal combustion engine started by a starter motor. The slave controller comprises an antenna circuit input for connection to an antenna circuit suitable for picking up an RF signal, an output and a control module. The control module is coupled to the antenna circuit input, and it is capable to acquire one of at least two operative modes, namely a common mode and a maintenance mode. In the common mode, the control module is responsive to a signal transmitted through the antenna circuit input and originating from the antenna circuit to perform a starting procedure to start the internal combustion engine, the starting procedure including a plurality of individual steps. In the maintenance mode the control module is operative to establish a data link with an external entity, receive a command sent on the data link and indicative of one or more steps of the starting procedure and then perform the one or more steps indicated by the command without performing the entire starting procedure.

BRIEF DESCRIPTION OF THE DRAWINGS

A detailed description of examples of implementation of the present invention is provided hereinbelow with reference to the following drawings, in which.

Figure 1:
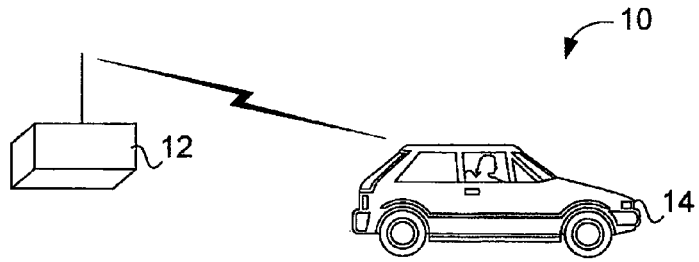
FIG. 1 illustrates a vehicle starting system.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a simplified illustration of a remote vehicle starting system 10. The system 10 has two components, namely a remote transmitter 12 that can be of hand-held configuration for ease of use, and a slave controller 16 mounted on-board the vehicle 14 that has an internal combustion engine started by a starter motor. The remote transmitter 12 and the slave controller 16 establish a Radio Frequency (RF) communication between them. This RF communication serves the basic purpose of transmitting commands from the remote transmitter 12 to the slave controller 16 that, in turn implements those commands. One of those commands is to start the engine, which is effected by cranking the starter motor.

In one form of implementation, the RF communication is unidirectional, that is commands are sent from the remote transmitter 12 to the slave controller 16. Optionally, the RF communication can be bi-directional where information is exchanged between the remote transmitter 12 and the slave controller 16.

The RF communication is effected under a specified protocol that can vary greatly according to the intended application. This feature is an implementation detail not critical to the present invention.

Note that while the drawings show a vehicle 14 in the form of an automobile, the invention also finds applications for vehicles other than automobiles, such as boats, or other vehicles powered by an internal combustion engine started by a starter motor.

Figure 2:
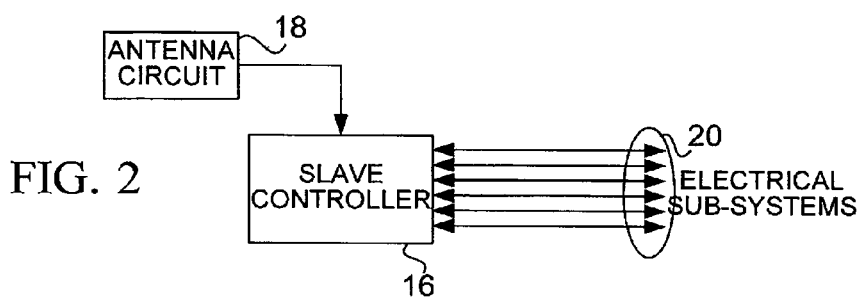
FIG. 2 is a block diagram of the slave controller of a remote vehicle starting system, mounted on board the vehicle.

FIG. 2 illustrates a block diagram of the slave controller 16 mounted on-board the vehicle 14. Details such as power supply connections and physical installation particulars have been omitted for the sake of clarity. The slave controller 16 is connected to an antenna circuit 18 on the one hand and to a plurality of electrical sub-systems 20 of the vehicle on the other hand.

The antenna circuit 18 includes an antenna not shown. The basic function of the antenna circuit 18 is to pick-up the RF signal issued by the remote transmitter 12. In one possible form of implementation, the signal as picked up by the antenna is sent to the slave controller 16 for processing. Optionally, the antenna circuit 18 includes a pre-processing component and sends to the slave controller 16 a pre-processed signal. Examples of pre-processing include demodulation of the signal picked up by the antenna.

Typically, the antenna circuit 18 is located remotely from the slave controller 16. In one specific and non-limiting example of implementation, the antenna circuit 18 is mounted on the windshield of the vehicle 14 and connects with the slave controller 16 through a suitable cable.

Figure 3:
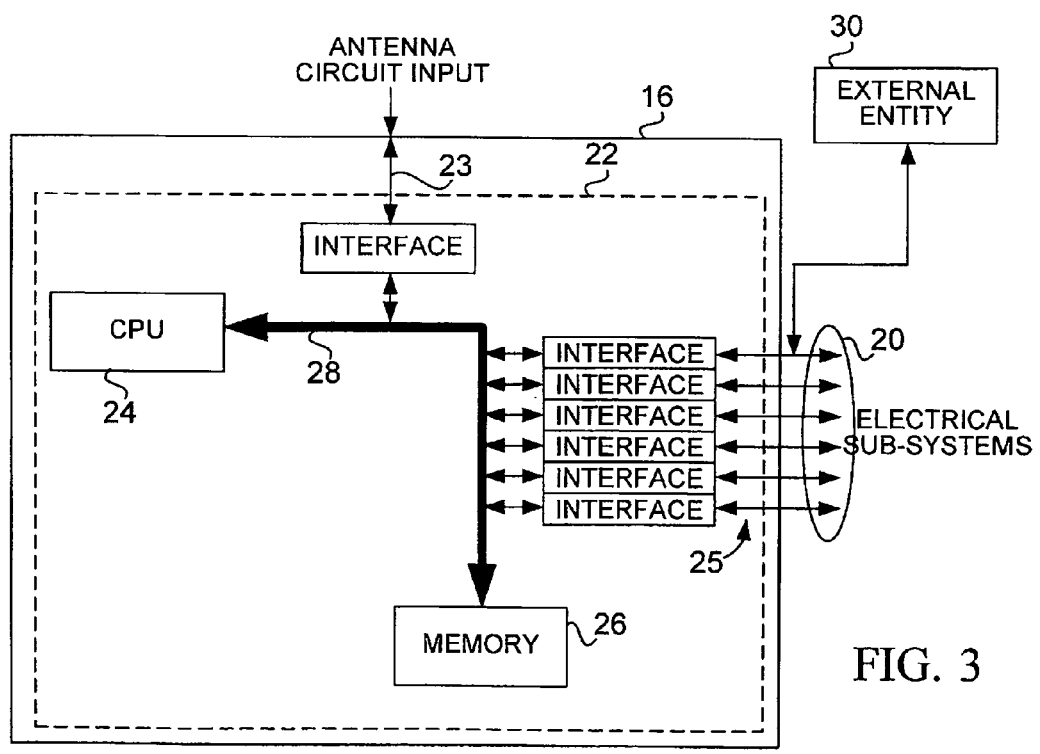
FIG. 3 is a detailed block diagram of the slave controller.

FIG. 3 illustrates in detail the slave controller 16. The slave controller 16 includes a control module 22. The control module 22 has an antenna circuit input 23 for connection to the antenna circuit 18 and a set of ports 25 for connection to respective electrical sub-systems 20 of the vehicle 14. Each port 25 can be unidirectional or bi-directional, depending upon the particular electrical sub-system with which it connects. A unidirectional port is a port that can act either as an input where the port receives information from the electrical sub-system with which it connects, or as an output where the port sends a signal to the electrical sub-system with which it connects, but not both. A bi-directional port is a port that can act as an input and as an output in circumstances where the electrical sub-system can send signals to the control module 22 or receive signals from the control module 22.

The control module is essentially a computing apparatus including a Central Processing Unit (CPU) 24 connected to a storage medium or memory 26 over a data bus 28. Note that although the drawings show the memory 26 as a single block, the memory 26 can be realized as several physical storage units independent from one another, with identical or different data storage properties, such as volatile, non-volatile, etc.

The memory 26 holds program data in the form of program instructions for execution by the CPU 24, in accordance with which the slave controller 16 will perform its intended function. It is advantageous to store the program data in a non-volatile unit of the memory 26 to avoid loss of data when no electrical power is supplied to the slave controller 16.

Generally, the program data has three main functional modules. The first functional module, when executed, provides a common mode of operation and, generally, performs the function of a remote vehicle starting system. More specifically, the first functional module, upon reception of a signal at the antenna circuit input 23 that conveys a command to start the engine, will perform an engine starting procedure. Broadly stated, this starting procedure generates a command signal at the port 25 connected to the starter sub-system of the vehicle 14, such as to cause the starter motor to crank the engine. The first functional module can also perform a variety of other optional operations that can be part of the starting procedure or part of a different procedure or function. Examples of such optional operations include:

1) Sensing the Revolutions Per Minute (RPM) of the engine by monitoring the signal on the RPM sensor electrical sub-system, thereby monitoring RPM information. The RPM information can be used to detect when the engine has started in order to cease cranking it. This is usually referred to as the RPM cut-off point. Also, the RPM information can be useful to monitor the engine for proper idle and avoid engine over speed. If the RPM increases beyond a certain point that indicates an over speed condition, then the slave controller 16 shuts down the engine;

2) Sensing power on the brake light electrical sub-system, which indicates when an occupant in the vehicle depresses the brake pedal;
3) Sensing activation of the hood sensor electrical sub-system. This information is useful to detect opening of the hood. When the engine has been remotely started, thus under no direct user supervision, opening of the hood is a warning condition which may indicate an illegal intrusion. The action taken in response to such warning condition can vary. One example is to turn off the engine of the vehicle;
4) Sensing activation of the trunk sensor electrical sub-system. This information is useful to detect opening of the trunk. When the engine has been remotely started, thus under no direct user supervision, opening of the trunk is a warning condition which may indicate an illegal intrusion. The action taken in response to such a warning condition can vary. One example is to turn off the engine of the vehicle;
5) Sensing activation of the door sensor electrical sub-system. This information is useful to detect opening of the door. When the engine has been remotely started, thus under no direct user supervision, opening of the door is a warning condition which may indicate an illegal intrusion. The action taken in response to such a warning condition can vary. One example is to turn off the engine of the vehicle;
6) Detection and recording of significant events, which are stored in an event log, held in the memory 26. When certain events and conditions arise, they may be recorded to aid malfunction diagnosis. The kind of events to record can greatly vary depending upon the particular logging strategy developed during the design of the remote vehicle starting system. One such strategy is to define the events to monitor and when any one of such events occurs an entry in the event log is made. An example of a significant event is an error code. When a fault condition arises an error code identifying the problem is stored in the memory 26. By examining the stored error codes, a technician can identify the reason for the malfunction. A fault condition or error code corresponds to a system state that is known to be abnormal. One possible example is a situation where the engine is being cranked by the slave controller 16, but the engine fails to start. Such a fault condition can be detected by starting a timer when the command signal directing the starter motor to crank the engine is generated. If the engine has not started after a certain time period, the occurrence of a fault condition is established and an error code generated and stored in the memory 26.

Another example of a significant event is status data, such as predetermined conditions at a particular time during the operation of the slave controller. An example of status data is the RPM value just before the engine starts.

It will be appreciated by the reader that the number of significant events that the program data in the memory 26 can detect when executed by the CPU 24 is a matter of design. The limitations are mostly of practical nature such as the complexity of the program data and the storage requirements of the slave controller to hold the program code that detects the significant events and the event log.

Specific examples of significant events include:
Engine stopped when sensing power on the brake light electrical sub-system, which is indicative when an occupant in the vehicle depresses the brake pedal;
Engine stopped as a result of activation of the alarm system;
No RPM detected when engine is being cranked or when engine is running;
Hood, trunk or door open;
Transmission is not in a secure condition.
Typically this means that the transmission is not in Park (P).
Ignition is ON when the RF command to start the engine is received by the slave controller 16;
Maximal time period during which the engine is allowed to run has expired;
The engine fails to start;
The RPM value recorded before the engine started. This event is not an error in itself—it is status data logged every time the engine is remotely started;
Engine over speed condition;
Engine starts but fails to maintain a minimal RPM value;
Control module failure;
Engine stopped by remote;
Engine stopped by alarm;
Main switch of slave controller in OFF position.

The program code that records the events in the event log also records in the event log one or more markers that allow determining when one or more of the recorded events occurred with relation to a certain point of reference in time. It is advantageous for a technician to determine when an event occurred with relation a certain reference in time such as to ascertain what are the events logged prior the reference and after the reference. For example the reference could be a point in time when a certain part on the slave controller was changed or the configuration of the slave controller changed. The technician would like to differentiate between the events logged before the change of parts or change of configuration and those after. This allows determining the effect of the change of parts or change of configuration. In one specific example, a marker in the form of a time stamp is logged in association with each entry in the event log. This type of marker allows the technician to determine the absolute time at which each event occurred and was logged and thus derive whether it happened before or after a certain reference. Another possibility that can be used in combination with or substituted to the time stamp is the date stamp.

In a possible variant, an external entity that will be described later can write an entry in the event log, the entry being recognizable from other entries. The writing can be done at the command of a technician that during a diagnostic procedure wants to create a break point in the list of logged events. At the time at which the break point is to be made, the technician writes the marker such that he or she can distinguish which events occurred and were logged before the break point or marker and those occurring and logged after the break point or marker. The marker can be any type of entry that can be distinguished from other entries in the list of logged events.

The common mode of operation functions in conjunction with a configuration file containing configuration data that is stored in the memory 26. The configuration file adapts the slave controller 16 to the particular vehicle in which it is installed. The configuration file is a data structure that contains information that the one of more of the functions or procedures run under the common mode of operation use when those functions or procedures are performed. The format in which the configuration data is stored in the configuration file is not critical to the invention. One procedure that uses the configuration file is the start-up procedure. Examples of the data that are held in the configuration file are found below:

Type of engine, gasoline or diesel;

Number of cylinders of the engine;

Starter cut-off RPM limit. When this RPM value is reached when the engine is cranked, the cranking will stop as the engine is presumed to be on the point of starting. Examples of RPM cut-off points that can be specified are 800 RPM, 600 RPM or 500 RPM;

Time during which glow plugs are operated before cranking is initiated (for diesel engine only);

Polarity of glow plugs;

State of ignition electrical sub-system (Turned Off or Maintained Active)

Type of hood/door/trunk sensor (normally sub-system is in an open state or closed state);

Turning ignition OFF between start cycles;

Original Equipment Manufacturer (OEM) alarm control enabled or disabled;

OEM alarm operation;

Accessory delay 0 or 3 seconds;

Antitheft enabled or disabled;

Antitheft type passive or active;

Multifunction output settings;

Pulse before ignition time;

Door lock time;

Automatic locking enabled or disabled;

Unlock pulse type single or double;

Acknowledge on second lock command enabled or disabled;

Multifunction output settings time delay;

Engine run time;

Low temperature activation enabled or disabled;

Low temperature run time;

The second functional module is designed to perform a maintenance procedure on the slave controller 16. Such a maintenance procedure can be preventive in nature or corrective, in other words designed to detect a malfunction that has occurred. The maintenance procedure involves the establishment of a data communication with an external entity such as to upload data from the slave controller 16 or download data to the slave controller 16. One example of downloading data to the slave controller 16 is to transfer to the memory 26 new program data designed to add a new functionality to the existing functionality provided by the original program data or to replace the existing program data by a new program data. Another example of sending data is to send commands to the slave controller 16 for execution. Yet another example of sending data to the slave controller 16 is to transfer to the memory 26 the configuration file such as to adapt the slave controller 16 to a specific vehicle. One example of transferring data from the slave controller 16 to the external entity is to transfer fully or in part the event log stored in the memory 26.

The second functional mode can be invoked in any variety of ways. One possibility is to send a specific command to the slave controller such that the latter enters the second functional module. By "command" is meant any condition that the slave controller 16 may recognize as a directive to invoke the second functional mode. Such command may be sent with the remote transmitter 12, as an RF signal. Another example is to provide on the slave controller a switch that must be manually operated such as to invoke the second functional mode. Yet, another possibility is to provide the slave controller with logic that automatically enters the second functional mode when it recognizes that the external entity is attempting to establish a data communicative relationship. For instance, while the slave controller 16 is in the common (first) mode of operation, if a data stream is observed at any one of its ports or communications points, the slave controller 16 will enter the second mode of operation.

The external entity is designated by 30 in FIG. 3. In order to establish a data communication with the control module, the external entity 30 connects with any one of the ports 25 or the antenna circuit input 23. Since the ports 25 are electrically connected to respective sub-systems of the vehicle 14, it suffices to connect the external entity 30 to one of the electrical sub-systems 20 such as to establish the electrical pathway between any one of the ports 25 and the external entity 30. In the case of the antenna circuit input 23, it suffices to connect the external entity 30 with the cable connecting the antenna circuit 18 to the antenna circuit input 23. Another possibility is to connect the external entity 30 with the slave controller 16 over an RF data link, the reception being made through the antenna circuit 18. This possibility only allows a single direction of communication. To allow the slave controller 16 to send data over the RF link it must be provided with RF transmission capabilities.

The external entity 30 can be designed in a variety of ways, the basic requirement being the ability to establish a data communication with the slave controller 16. In one possible example, the external entity is in the form of a computing apparatus running a program that can establish the communication session with the slave controller 16 according to any suitable protocol, such as to send data to the slave controller 16, receive data from the slave controller 16, or both.

The external entity 30 has features designed in the specific way they are to interact with the slave controller 16. When the external entity 30 is used solely to upgrade the program data held in the memory 26, the external entity 30 does not require any elaborate user interface. On the other hand, when the external entity 30 is designed to send commands to the slave controller 16 and/or to receive the event log, the external entity 30 is provided with a user interface suitable to the task. More specifically, the user interface allows the operator to select the command to be sent and displays to the operator the information received from the slave controller 16. Several examples of data communication will be discussed below:

1) The external entity updates the program data held in the memory 26. The program data to be sent to the slave controller is loaded in the external entity from a variety of sources. One possibility is to design the external entity such that it communicates over the Internet with a site containing the program data. Over such an Internet connection, the program data is loaded in the external entity and is then available for transmission to the slave controller. To perform the program data updating process, the external entity is connected to the slave controller 16 in a number of possible ways, as discussed earlier. The slave controller enters the second mode of operation. The external entity 30 and the slave controller 16 perform the necessary handshaking procedure and the external entity 30 sends the program data to the slave controller 30. The latter replaces fully or in part the existing program data in the memory 26 with the new program data.

2) The external entity updates or loads the configuration file in the memory 26. This is done as described earlier.

3) The external entity obtains the event log. The external entity 30 is connected to the slave controller 16 as described earlier and the latter enters the second mode of operation. The external entity 30 and the slave controller 16 perform the necessary handshaking procedure and the external entity 30 sends a request for obtaining the events log. The slave controller 16 sends the data in the events log to the external entity. In the case when the external entity is provided with a display, the operator can see the individual events. The external entity can also be provided with the capability to send commands to the slave controller 16 such as to erase all the entries in the event log or to enter a marker or break point in the list of events, as described earlier.

4) The external entity sends discrete commands for execution by the slave controller 16 or obtains status data not part of the events log. As previously described, the external entity 30 connects to the slave controller 16 and the latter enters the second mode of operation. The operator can select specific commands through the user interface of the external entity 30 that are sent to the slave controller 16 for execution. For example, such commands may be indicative of one or more steps of the starting procedure. The slave controller 16 receives those commands and executes them, without however, performing the entire starting procedure. This feature is particularly useful to diagnose certain problems as the operator can easily determine if the slave controller is capable to carry out correctly all the steps in a certain procedure. Specific examples of commands that can be sent to the slave controller 16 for execution include energizing the starter motor, activating the ignition system, activating the horn and activating the anti-theft system, among others. Yet, another possibility is the send commands from the external entity 30 to the slave controller 16 to request from the slave controller 16 operational status data that is normally not recorded in the events log. The slave controller 16 executes the command by sending to the external entity the requested status information. Examples of such operational status data include the operational status of the hood, the trunk or the door.

5) The external entity sends data to the slave controller 16 that directs the slave controller to perform one or more functions a user can request via the remote transmitter 12. In a sense, this feature allows the installer or repairman to simulate how the slave controller 16 will react when the user requests a certain function and dials the appropriate command on the remote transmitter 12 which is wirelessly sent to the slave controller 16. An example of one such function is starting the vehicle. Here, in contrast to the case detailed in paragraph 4 above, the slave controller implements the entire starting procedure such as to demonstrate that it has been correctly configured. Accordingly, the installer or repairman can determine exactly what the slave controller 16 will do when the user dials commands on the wireless transmitter 12 without the necessity of actually sending those functions or commands from the wireless transmitter 12.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A slave controller for mounting in a vehicle having an internal combustion engine started by a starter motor, said slave controller comprising:
   a) an antenna circuit input for connection to an antenna circuit suitable for picking up a radio frequency signal, the antenna circuit having a component for pre-processing the radio-frequency signal;
   b) an output;
   c) a control module, coupled to said antenna circuit input, said control module:
      i) being responsive to a signal transmitted through said antenna circuit input and originating from the antenna circuit to generate a command signal at said output for directing the starter motor to crank the internal combustion engine;
      ii) being operative to establish a data communication with an external entity through said antenna circuit input to perform a maintenance procedure.

2. A slave controller as defined in claim 1, wherein said control module includes:
   i) a CPU;
   ii) a storage medium for storing program data for execution by said CPU;
   iii) wherein the generation of the command signal is effected at least in part on a basis of processing of data by said CPU by execution of said program data;
   iv) said program data being a first program data;
   v) wherein the data communication includes the transmission to said control module of second program data, said control module being operative during a maintenance procedure to place the second program data in said storage medium, the second program data being suitable for execution by said CPU.

3. A slave controller as defined in claim 2, wherein said control module is operative during the maintenance procedure to replace the first program data by the second program data.

4. A slave controller as defined in claim 3, wherein the data communication includes the transmission of operational status information from said control module to the external entity.

5. A slave controller as defined in claim 4, wherein the operational status information includes at least one error code.

6. A slave controller for mounting in a vehicle as defined in claim 1, wherein the component for pre-processing the radio-frequency signal performs demodulation of the radio-frequency signal.

7. A slave controller for mounting in a vehicle as defined in claim 6, wherein the maintenance procedure includes transmitting configuration data from the external entity to said control module, the configuration data allowing configuring said slave controller to the vehicle.

8. A slave controller for mounting in a vehicle as defined in claim 7, wherein the configuration data specifies a type of internal combustion engine of the vehicle.

9. A slave controller for mounting in a vehicle as defined in claim 8, wherein the type of internal combustion engine is either a gasoline internal combustion engine or a diesel internal combustion engine.

10. A slave controller for mounting in a vehicle as defined in claim 7, wherein the internal combustion engine of the vehicle is characterized by a number of cylinders, the configuration data specifies the number of cylinders.

11. A slave controller for mounting in a vehicle as defined in claim 7, wherein the configuration data specifies a starter cut-off RPM limit.

12. A slave controller for mounting in a vehicle as defined in claim 7, wherein the vehicle has a diesel internal combustion engine having glow plugs, the configuration data specifies a time during which the glow plugs are to be operated before directing the starter motor to crank the diesel internal combustion engine.

13. A slave controller for mounting in a vehicle as defined in claim 12, wherein the configuration data specifies a polarity of the glow plugs.

14. A slave controller for mounting in a vehicle as defined in claim 7, wherein the vehicle has an ignition electrical sub-system, the configuration data indicates whether the ignition electrical sub-system should be turned off or maintained active.

15. A slave controller for mounting in a vehicle as defined in claim 7, wherein the vehicle has hood sensor, the configuration data indicates whether the hood sensor is normally in an opened state or a closed state.

16. A slave controller for mounting in a vehicle as defined in claim 7, wherein the vehicle has door sensor, the configuration data indicates whether the door sensor is normally in an opened state or a closed state.

17. A slave controller for mounting in a vehicle as defined in claim 7, wherein the particular vehicle has trunk sensor, the configuration data indicates whether the trunk sensor is normally in an opened state or a closed state.

18. A slave controller for mounting in a vehicle having a plurality of electrical sub-systems, one of the electrical sub-systems being a starter sub-system operative to crank an internal combustion engine, said slave controller comprising:
   a) an antenna circuit input for connection to an antenna circuit suitable for picking up an RF signal;
   b) a set of ports, each port being suitable for electrical connection to a respective electrical sub-system of the plurality of electrical sub-systems, said set of ports including a starter port suitable for electrical connection to the starter sub-system;
   c) a control module, coupled to said set of ports and to the antenna circuit, said control module:
   i) being responsive to the RF signal to generate a command signal at said starter port for causing energization of the starter sub-system;
   ii) being operative to establish a data communication with an external entity through at least one port of said set of ports via the respective electrical sub-system thereof, to perform a maintenance procedure.

19. A slave controller as defined in claim 18, wherein the plurality of electrical sub-systems includes a brake light electrical sub-system, said set of ports including a brake light port for connection to the brake light electrical sub-system, said control module being operative to establish a data communication with the external entity through said brake light port via the brake light electrical sub-system to perform a maintenance procedure.

20. A slave controller as defined in claim 18, wherein the plurality of electrical sub-systems includes a hood sensor electrical sub-system, said set of ports including a hood sensor port for connection to the hood sensor electrical sub-system, said control module being operative to establish a data communication with the external entity through said hood sensor port via the hood sensor electrical sub-system to perform a maintenance procedure.

21. A slave controller as defined in claim 18, wherein the plurality of electrical sub-systems includes a trunk sensor electrical sub-system, said set of ports including a trunk sensor port for connection to the trunk sensor electrical sub-system, said control module being operative to establish a data communication with the external entity through said trunk sensor port via the trunk sensor electrical sub-system to perform a maintenance procedure.

22. A slave controller as defined in claim 18, wherein the plurality of electrical sub-systems includes a door sensor electrical sub-system, said set of ports including a door sensor port for connection to the door sensor electrical sub-system, said control module being operative to establish a data communication with the external entity through the door sensor port via said door sensor electrical sub-system to perform a maintenance procedure.

23. A slave controller as defined in claim 18, wherein the plurality of electrical sub-systems includes an RPM sensor electrical sub-system, said set of ports including an RPM sensor port for connection to the RPM sensor electrical sub-system, said control module being operative to establish a data communication with the external entity through the RPM sensor port via said RPM sensor electrical sub-system to perform a maintenance procedure.

24. A slave controller as defined in claim 18, wherein the plurality of electrical sub-systems includes a coolant temperature sensor electrical sub-system, said set of ports including a coolant temperature sensor port for connection to the coolant temperature sensor electrical sub-system, said control module being operative to establish a data communication with the external entity through the coolant temperature sensor port via said coolant temperature sensor electrical sub-system to perform a maintenance procedure.

25. A slave controller for mounting in a vehicle as defined in claim 18, wherein the maintenance procedure includes transmitting configuration data from the external entity to said control module, the configuration data allowing configuring said slave controller to the vehicle.

26. A slave controller for mounting in a vehicle as defined in claim 25, wherein the configuration data specifies a type of internal combustion engine of the vehicle.

27. A slave controller for mounting in a vehicle as defined in claim 26, wherein the type of internal combustion engine is either a gasoline internal combustion engine or a diesel internal combustion engine.

28. A slave controller for mounting in a vehicle as defined in claim 25, wherein the internal combustion engine of the vehicle is characterized by a number of cylinders, the configuration data specifies the number of cylinders.

29. A slave controller for mounting in a vehicle as defined in claim 25, wherein the configuration data specifies a starter cut-off RPM limit.

30. A slave controller for mounting in a vehicle as defined in claim 25, wherein the vehicle has a diesel internal combustion engine having glow plugs, the configuration data specifies a time during which the glow plugs are to be operated before directing the starter motor to crank the diesel internal combustion engine.

31. A slave controller for mounting in a vehicle as defined in claim 30, wherein the configuration data specifies a polarity of the glow plugs.

32. A slave controller for mounting in a vehicle as defined in claim 25, wherein the vehicle has an ignition electrical sub-system, the configuration data indicates whether the ignition electrical sub-system should be turned off or maintained active.

33. A slave controller for mounting in a vehicle as defined in claim 25, wherein the vehicle has hood sensor, the configuration data indicates whether the hood sensor is normally in an opened state or a closed state.

34. A slave controller for mounting in a vehicle as defined in claim 25, wherein the vehicle has door sensor, the configuration data indicates whether the door sensor is normally in an opened state or a closed state.

35. A slave controller for mounting in a vehicle as defined in claim 25, wherein the particular vehicle has trunk sensor, the configuration data indicates whether the trunk sensor is normally in an opened state or a closed state.

36. A slave controller for mounting in a vehicle having an internal combustion engine started by a starter motor, said slave controller comprising:
   a) an antenna circuit input for connection to an antenna circuit suitable for picking up an RF signal;

b) an output;
c) a control module, coupled to said antenna circuit input and to said output, said control module including:
  i) a CPU;
  ii) a storage medium for storing program data for execution by said CPU and an event log;
  iii) said control module being responsive to an RF signal transmitted through said antenna circuit input and originating from the antenna circuit to generate a command signal at said output for directing the starter motor to crank the internal combustion engine;
  iv) wherein the generation of the command signal being effected at least in part on a basis of processing of data by said CPU by execution of said program data;
  v) said program data, while executed by said CPU, monitoring said control module for occurrence of predetermined events and, if at least one of the predetermined events occurs, creating an entry in the event log associated with the occurred predetermined event;
  vi) said program data, while executed by said CPU being operative to record at least one marker in said event log allowing to differentiate between an order of occurrence of events recorded in said event log.

37. A slave controller as defined in claim 36, wherein the marker includes a time stamp.

38. A slave controller as defined in claim 37, wherein said program data, while executed by said CPU, being operative to record in said event log a time stamp in association with each event recorded in the event log.

39. A slave controller as defined in claim 38, wherein the predetermined events are selected in the group consisting of:
  1) engine stopped when sensing power on the brake light electrical sub-system;
  2) engine stopped as a result of activation of the alarm system;
  3) no RPM detected when engine is being cranked or when engine is running;
  4) hood, trunk or door open;
  5) transmission is not in a secure condition meaning that the transmission is not in Park (P);
  6) ignition is ON when the RF command to start the engine is received by the slave controller;
  7) maximal time period during which the engine is allowed to run has expired;
  8) the engine fails to start;
  9) the RPM value recorded before the engine started;
  10) engine over speed condition;
  11) engine starts but fails to maintain a minimal RPM value;
  12) control module failure;
  13) engine stopped by remote; and
  14) engine stopped by alarm;
  15) main switch of slave controller in OFF position.

40. A slave controller as defined in claim 39, wherein said control module is operative to establish a data communicative relationship with an external entity to transmit to the external entity data from the event log.

41. A slave controller as defined in claim 40, wherein said program data, while executed by said CPU is operative to record in the event log a date stamp in association with each event recorded in the event log.

42. A slave controller for mounting in a vehicle having an internal combustion engine started by a starter motor, said slave controller comprising:
  a) an antenna circuit input for connection to an antenna circuit suitable for picking up an RF signal;
  b) an output;
  c) a control module, coupled to said antenna circuit input, said control module being capable to acquire one of at least two operative modes, namely a common mode and a maintenance mode
  wherein:
    1) in said common mode, said control module being responsive to a signal transmitted through said antenna circuit input and originating from the antenna circuit to perform a starting procedure to start the internal combustion engine, said starting procedure including a plurality of individual steps;
    2) in said maintenance mode said control module:
      (a) is operative to establish a data link with an external entity;
      (b) is operative to receive a command sent on the data link and indicative of one or more steps of the starting procedure;
      (c) performing the one or more steps indicated by the command without performing the entire starting procedure.

43. A slave controller as defined in claim 42, wherein said starting procedure includes a step to energize the starter motor, said control module being responsive to a command sent on the data link indicative of the step to energize the starter motor to perform the step of energizing the starter motor without performing the entire starting procedure.

44. A slave controller as defined in claim 42, wherein the starter motor has an ignition system, said starting procedure including a step to activate the ignition system, said control module being responsive to a command sent on the data link indicative of the step to activate the ignition system to perform the step of activating the ignition system without performing the entire starting procedure.

45. A slave controller as defined in claim 42, wherein the vehicle has a horn, in said common mode said control module being operative to activate the horn, said control module being responsive to a command sent on the data link indicative of the step to activate the horn to perform the step of activating the horn without performing the starting procedure.

46. A slave controller as defined in claim 42, wherein the vehicle has an anti-theft system, in said common mode said control module is operative to activate the anti-theft system, said control module being responsive to a command sent on the data link indicative of the step to activate the anti-theft system to perform the step of activating the anti-theft system without performing the starting procedure.

47. A slave controller as defined in claim 42, wherein the vehicle has a hood sensor electrical sub-system, during said common mode said controller module being operative to assess an operational status of the hood sensor electrical sub-system, said control module being responsive to a command sent on the data link indicative of the step to assess the operational status of the hood sensor electrical sub-system to assess the operational status of the hood sensor electrical sub-system and transmit over the data link the assessed operational status of the hood sensor electrical sub-system.

48. A slave controller as defined in claim 42, wherein the vehicle has a trunk sensor electrical sub-system, during said common mode said controller module being operative to assess an operational status of the trunk sensor electrical sub-system, said control module being responsive to a command sent on the data link indicative of the step to assess the operational status of the trunk sensor electrical sub-system to assess the operational status of the trunk sensor electrical sub-system and transmit over the data link the assessed operational status of the trunk sensor electrical sub-system.

49. A slave controller as defined in claim 42, wherein the vehicle has a door sensor electrical sub-system, during said common mode said controller module being operative to assess an operational status of the door sensor electrical sub-system, said control module being responsive to a command sent on the data link indicative of the step to assess the operational status of the door sensor electrical sub-system to assess the operational status of the door sensor electrical sub-system and transmit over the data link the assessed operational status of the door sensor electrical sub-system.

50. A slave controller as defined in claim 42, wherein the vehicle has a dome light electrical sub-system, during said common mode said controller module being operative to assess an operational status of the dome light electrical sub-system, said control module being responsive to a command sent on the data link indicative of the step to assess the operational status of the dome light electrical sub-system to assess the operational status of the dome light electrical sub-system and transmit over the data link the assessed operational status of the dome light electrical sub-system.

51. A slave controller for mounting in a vehicle having an internal combustion engine started by a starter motor, said slave controller comprising:
 a) an antenna circuit input for connection to an antenna circuit suitable for picking up an RF signal;
 b) an output;
 c) a control module, coupled to said antenna circuit input, said control module being capable to acquire one of at least two operative modes, namely a common mode and a maintenance mode wherein:
  i. in said common mode, said control module being responsive to a signal transmitted through said antenna circuit input and originating from the antenna circuit to perform a starting procedure to start the internal combustion engine, said starting procedure including a plurality of individual steps;
  ii. in said maintenance mode said control module:
   1. is operative to establish a data link with an external entity;
   2. is operative to receive a command sent on the data link to perform the starting procedure;
   3. performing the entire starting procedure.

52. A method for configuring a slave controller for installation in a particular vehicle, the slave controller being configurable for installation in a range of individual vehicles including the particular vehicle, the particular vehicle having an internal combustion engine and a starter motor for cranking the internal combustion engine,
 a) said slave controller having an output;
 b) said slave controller being responsive to an RF signal containing a command to start the internal combustion engine to generate a command signal at said output for directing the starter motor to crank the internal combustion engine,
 c) said method including:
 i) downloading configuration information corresponding to the particular vehicle into an external device from a remote location over the Internet;
 ii) establishing a data communication between the external device and the slave controller to configure the slave controller on the basis of the configuration information.

53. A method for configuring a slave controller as defined in claim 52, wherein said slave controller includes a control module, having:
 a) a CPU;
 b) storage medium for storing program data for execution by said CPU, wherein the generation of the command signal being effected by execution of said program data by said CPU;
 c) said method including transferring configuration data during the data communication to said slave controller and storing the configuration data in said storage medium.

54. A method for configuring a slave controller as defined in claim 53, wherein the data communication is established over a wireless link.

55. A method for configuring a slave controller as defined in claim 53, wherein the data communication is established over an RF link.

56. A method for configuring a slave controller as defined in claim 53, wherein the data communication is established over an electrical pathway between said control module and the external entity.

57. A method for configuring a slave controller as defined in claim 53, wherein the configuration data forms a configuration file processed by said CPU during execution of said program data.

58. A method for configuring a slave controller as defined in claim 53, wherein the configuration data specifies a type of internal combustion engine of the particular vehicle.

59. A method for configuring a slave controller as defined in claim 53, wherein the type of internal combustion engine is either a gasoline internal combustion engine or a diesel internal combustion engine.

60. A method for configuring a slave controller as defined in claim 53, wherein the internal combustion engine of the particular vehicle is characterized by a number of cylinders, the configuration data specifies the number of cylinders.

61. A method for configuring a slave controller as defined in claim 53, wherein the configuration data specifies a starter cut-off RPM limit.

62. A method for configuring a slave controller as defined in claim 53, wherein the particular vehicle has a diesel internal combustion engine having glow plugs, the configuration data specifies a time during which the glow plugs are to be operated before directing the starter motor to crank the diesel internal combustion engine.

63. A method for configuring a slave controller as defined in claim 62, wherein the configuration data specifies a polarity of the glow plugs.

64. A method for configuring a slave controller as defined in claim 53, wherein the particular vehicle has an ignition electrical sub-system, the configuration data indicates whether the ignition electrical sub-system should be turned off or maintained active.

65. A method for configuring a slave controller as defined in claim 53, wherein the particular vehicle has hood sensor, the configuration data indicates whether the hood sensor is normally in an opened state or a closed state.

66. A method for configuring a slave controller as defined in claim 53, wherein the particular vehicle has door sensor, the configuration data indicates whether the door sensor is normally in an opened state or a closed state.

67. A method for configuring a slave controller as defined in claim 53, wherein the particular vehicle has trunk sensor, the configuration data indicates whether the trunk sensor is normally in an opened state or a closed state.

68. A method for configuring a slave controller as defined in claim 53, wherein the particular vehicle has an ignition electrical sub-system, the configuration data indicates whether the ignition electrical sub-system should be turned off between start cycles.

69. A method for configuring a slave controller as defined in claim 53, wherein the particular vehicle has an OEM alarm system, the configuration data indicates whether the OEM alarm system is to be enabled or disabled.

70. A method for configuring a slave controller as defined in claim 53, wherein the particular vehicle has an antitheft system, the configuration data indicates whether the system is to be enabled or disabled.

71. A method for configuring a slave controller as defined in claim 70, wherein the configuration data indicates whether the antitheft system is passive or active.

\* \* \* \* \*